INVENTORS.
ROBERT ASHTON &
M. LEROY GULLICKSON
BY Tweedale & Gerhardt
ATTORNEYS.

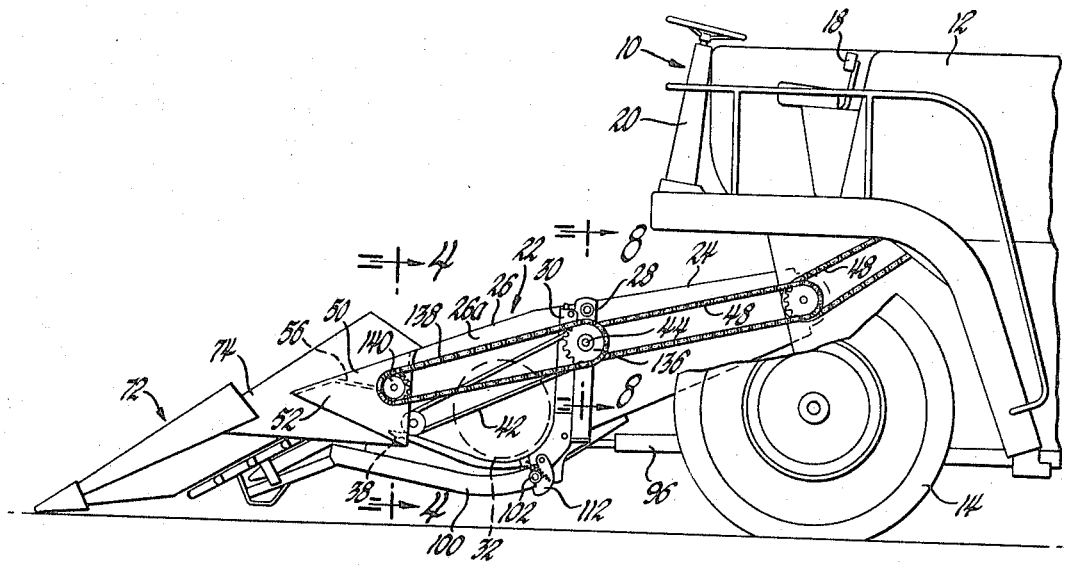

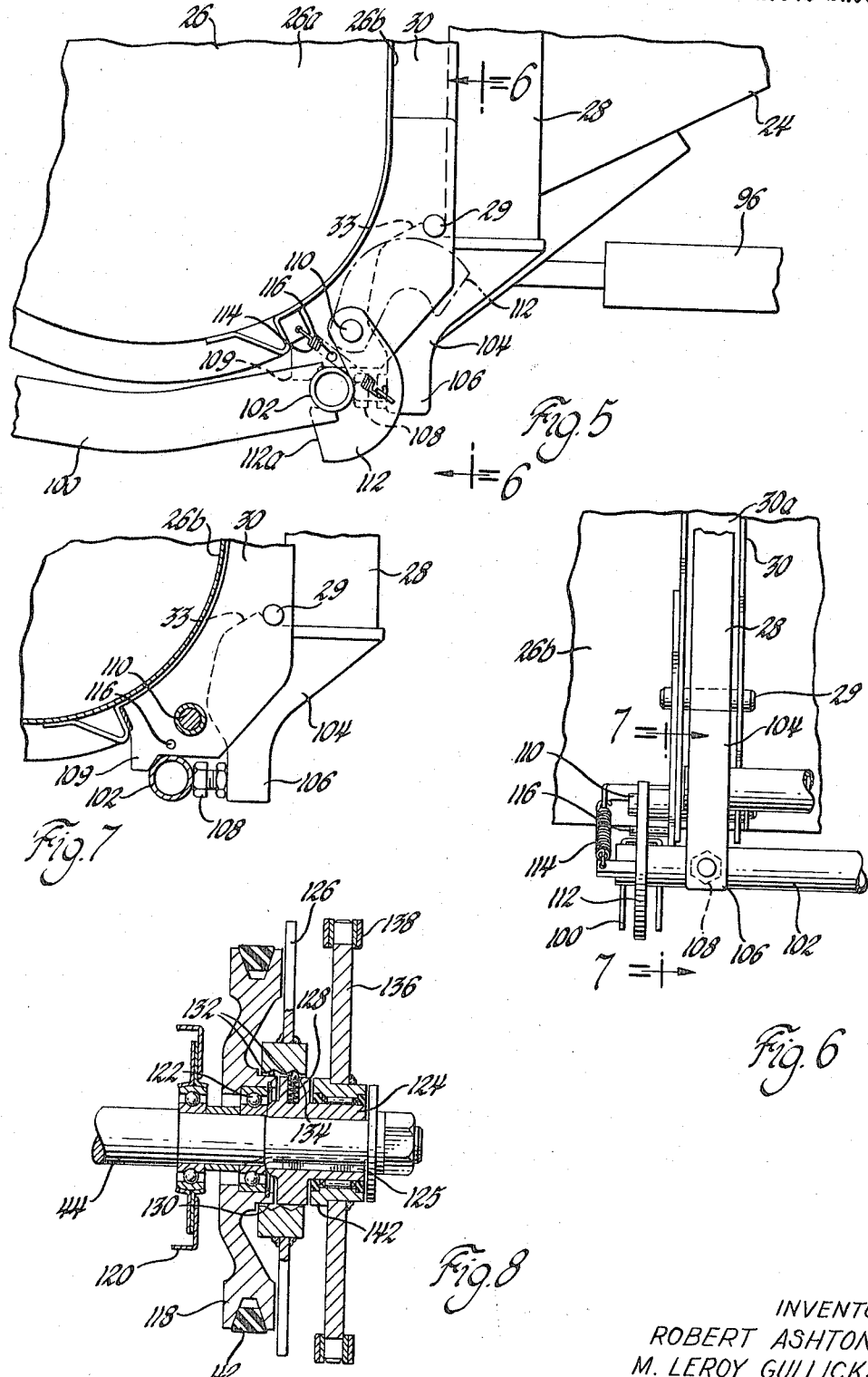

3,324,635
COMBINE HAVING CORN OR MAIZE
HARVESTING ATTACHMENT
Robert Ashton, Islington, Ontario, and Myron Leroy Gullickson, Albion Township, Ontario, Canada, assignors to Massey-Ferguson Limited, Toronto, Ontario, Canada
Filed July 28, 1964, Ser. No. 385,682
26 Claims. (Cl. 56—2)

This invention relates to combine harvesters and more particularly to a combine header assembly having a corn (maize) harvesting attachment.

Corn or maize harvesting attachments for combines have generally been of the type including gathering units, snapping rolls, an auger and feed elevator that is mounted directly on the main body of the combine to replace the entire grain header assembly. Such corn headers are expensive, heavy, and difficult to maneuver in changing from grain harvesting to corn harvesting.

An object of this invention is to provide a combine having a corn or maize harvesting attachment of light weight and low cost that can be detachably mounted on the table of the grain header eliminating the necessity of removing the grain header and providing a separate table, auger and elevator for harvesting corn (maize) or similar crops.

Another object is to provide a combine header assembly that can be converted to harvest either corn (maize) or similar crops or grain crops such as wheat, barley and oats without removing the entire header assembly from the main body of the combine.

Still another object is to provide a corn or maize harvesting attachment that can be mounted on the table of the grain header by manipulation of the power equipment of the combine requiring a minimum amount of physical effort on the part of the operator.

A still further object is to provide a corn or maize harvesting attachment for removing ears of corn from their stalks that can be mounted on the table of the grain head of the combine in such a manner that the corn ears are deposited onto the table by the attachment and carried to the threshing and other crop treating mechanism of the combine by the conveyor and feed elevator of the grain header.

The present invention consists of a combine header provided with the usual table, auger, cutter bar, reel and elevating conveyor and which is arranged for quick detachment of the reel and for ready attachment of a corn (maize) gathering and snapping unit at the front of the table in at least a part of the space otherwise occupied by the reel. The attachment is effected by providing guide tracks or grooves on the vertical end walls of either the attachment or of the table, and the corn or maize harvesting attachment or the table, respectively, is provided with laterally projecting rollers which are received by the tracks or grooves upon manipulation of the power equipment of the combine. With the rollers engaged in the grooves, the corn harvesting attachment is pivotally supported on the table, and, upon upward movement of the table, the weight of the attachment causes it to pivot downwardly until a pair of rearwardly projecting arms on the corn (maize) attachment engages abutments located in the grain header to bring the corn attachment into proper orientation with the table, whereupon the arms are then locked against the abutments by spring-loaded latches. Clutch means are provided to disengage the cutter bar from its drive shaft and connect the corn (maize) harvesting attachment therewith.

Other objects and advantages of the invention will become apparent from the following description taken in connection with the accompanying drawings in which:

FIGS. 1, 2, and 3 are side elevations of the combine having a header assembly embodying the invention and illustrating the steps of connecting the corn (maize) harvesting attachment with the grain table;

FIG. 4 is a partial sectional view taken on lines 4—4 of FIG. 3;

FIG. 5 is an enlarged detail view of the latching means;

FIG. 6 is a view taken along lines 6—6 of FIG. 5;

FIG. 7 is a sectional detail view taken on lines 7—7 of FIG. 6; and

FIG. 8 is a sectional detail view taken on lines 8—8 of FIG. 3.

While the invention will be described in connection with the preferred embodiment, it will be understood that we do not intend to limit the invention to the specific embodiment illustrated. On the contrary, it is intended that all alternatives, modifications and equivalents, which may be included within spirit and scope of the invention are to be covered by the present invention.

Figure 1:
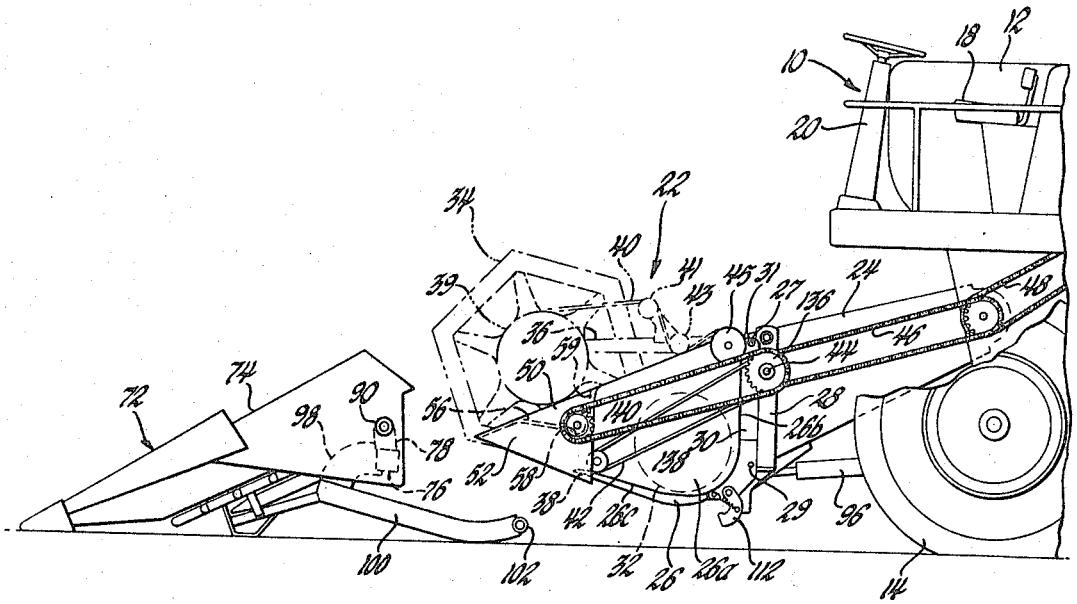
Figure 2:
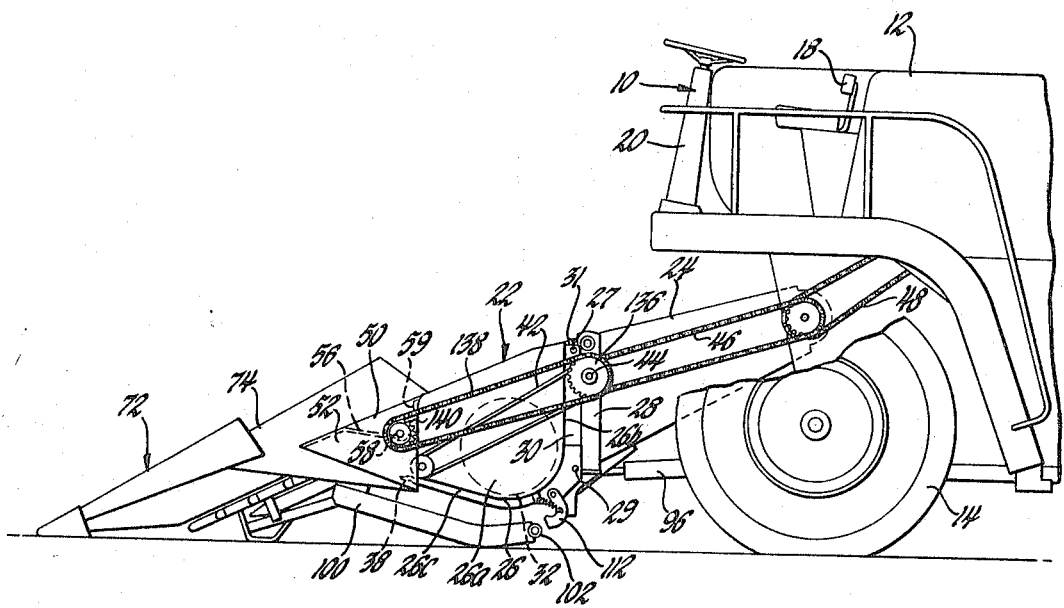

With reference to FIGS. 1, 2 and 3, reference numeral 10 designates generally a combine having a main body 12, front wheels 14 (only one of which is visible in the drawing), and an operator's platform 16 on which is supported a seat 18 and steering column 20. Supported for vertical, pivotal movement on the forward end of main body 12 of the combine is a header assembly 22.

Header assembly 22 includes a conventional feed elevator 24 having an undershot, endless conveyor (not shown) for carrying cut crop material from the transverse grain receiving table or platform 26 into the threshing and other crop treating mechanism within the main body 12. In the illustrated embodiment, table 26 is detachably supported on the forward end of the housing portion of elevator 24 by interengageable connectors 28 and 30 so that table 26 can be detached from the elevator for transport or replacement.

Connector 30 is of channel shape to define a groove 30a (FIG. 6). Pins 27 and 29 (FIGS. 1 and 5–7) are mounted transversely in the side walls of the channel section and extend across groove 30a to receive upper and lower hooks 31 and 33, respectively, formed on connector 28. The details of connectors 28 and 30 form no part of the present invention.

Table 26 is generally in the shape of a scoop having end walls 26a joined by a rear wall 26b and a deck or bottom wall 26c. Mounted on the leading edge of deck 26c is a conventional cutter bar 38 for cutting standing grain as the combine advances through the crop. The cut grain falls onto deck 26c where it is carried to the inlet of feed elevator 24 by a conveyor 32 which is commonly of the auger type rotatably supported between end walls 26a and formed with oppositely disposed flights for moving the cut crop material to the central portion of table 26 to be picked up by elevator 24.

For harvesting grain crops such as wheat, barley and alfalfa, a grain reel 34 is detachably supported on table 26 by means of support arms 36 and is rotatably driven by a belt 40 extending around pulleys 39, 41, 43 and 45 as shown by the phantom lines in FIG. 1. Cutter bar 38 is drivingly connected by means of a belt 42 to an output shaft 44 journalled in elevator 24 and table 26, shaft 44 in turn being driven through chains 46 and 48 by the combine engine.

End walls 26a of table 26 are supported on end frame members 54 (FIG. 4) and project forwardly to form side wings 50. Supported on the outer wall of wings 50 is a sheet metal shield 52 having a curved upper edge 53 which is secured to the outer end wall 26a. Formed along the upper edge of frame member 54 is a coupling element in the form of a track member 56 which is inclined downwardly and rearwardly in FIGS. 1–3 and is formed at its rear with a substantially semi-circular groove or recess 58 terminating at a vertical frame member 59.

As shown in FIG. 4, a pair of support brackets 60 and 61 are mounted respectively on wall 26a and shield 52 for supporting a bearing sleeve 62 in axial alignment with groove 58. Bearing assemblies 64 and 66 are mounted in sleeves 62, and a spacer sleeve 68 is supported axially between the bearing assemblies. Rotatably mounted in bearing assemblies 64 and 66 is an input or drive shaft 70 for a corn or maize harvesting attachment 72 (FIGS. 1, 2 and 3) having conventional snapping rolls and gathering units indicated generally by reference numeral 74. Extending laterally between the end walls of the corn attachment is a main beam or rear frame member 76 having a pair of support brackets 78 welded to its upper edge at each end thereof, only one pair being visible in the drawings. Secured to support brackets 78 is a sleeve 80 in which is mounted a cylindrical bearing member 82. Slideably mounted in cylindrical bearing member 82 is an internally splined shaft coupling 84 which is slideably engaged with a shaft 86 having an externally splined end portion 88. Rotatably mounted at the opposite end of sleeve 80 from shaft 86 is a coupling element in the form of a roller 90 which is axially retained on sleeve 80 by means of a snap ring 92. Input shaft 70 has an externally splined end portion 94 which is slideably engageable with shaft coupling member 84.

Shaft coupling member 84 is retractable out of engagement with input shaft 70 (towards the left as viewed in FIG. 4) to disconnect shaft 70 from shaft 86. With grain reel 34, drive means 40, 41, 43, etc., and support arms 36 removed from the table 26, attachment 72 can be mounted on table 26 by moving the header axially toward attachment 72 with track 56 and groove 58 positioned beneath rollers 90. Header assembly 22 is vertically movable by means of hydraulic piston and cylinder assemblies 96 in the usual manner. By extending the piston assemblies 96, table 26 may be raised beneath rollers 90 until the rollers engage the track and roll in to grooves 58 to pivotally couple the corn harvesting attachment to table 26. Shaft coupling member 80 is then actuated toward the right as viewed in FIG. 4 to couple shafts 70 and 86 together.

Mounted on main beam 76 by means of a support bracket 98 (FIG. 1) is a pair of rearwardly directed abutment engaging arms 100 of inverted U-shape (FIG. 6) having their outer ends connected by means of a tubular rod 102. Formed at the lower end of coupling member 28 on elevator 24 is a base portion 104 formed with a depending extension 106 at its lower end. Threadedly mounted in extension 106 is an adjustable abutment 108. Upon further upward movement of table 26 after engagement of rollers 90 with groove 58, the weight of the row crop attachment causes it to pivot downwardly (counter-clockwise as viewed in FIGS. 1, 2 and 3) until tube 102 engages abutment 108 to stop the downward pivotal movement of the corn harvesting attachment. Thus with rollers 90 received in recesses 58, the corn or maize harvesting attachment is pivotally supported on the platform, but its downward or counter-clockwise pivotal movement is limited by engagement of arms 100 and tube 102 with abutment 108. Connector 30 is formed with a depending lip 109 which forms a cavity with abutment 108 and extension 106 for receiving tube 102.

Mounted on a pivot 110 on coupling frame 30 (FIGS. 5, 6 and 7) is a latching hook 112 rotatable about pivot 110 between two extreme positions due to an over-center spring 114 secured between hook 112 and table 26. By rotating hook 112 in a counter-clockwise direction about pivot 110 as viewed in FIG. 5 until spring 114 moves across the axis of pivot 110, the hook can be shifted to a stored position as shown by the phantom lines in FIG. 5. Conversely, the hook can be moved from the stored position to the actuated position as shown in full lines in FIG. 5 by rotating the latching hook clockwise about pivot 110 until spring 114 again passes over the axis of pivot 110 to urge the hook in a clockwise direction. Over-travel of the hook is prevented by a pin 116 mounted in connector 30 and projecting into the path of the leading edge of the hook. In the actuated position of the hook, tube 102 is received in the hook and is prevented from separating from the platform to rigidly connect the row crop attachment to the platform 26.

The manner in which the combine is converted to operate as a corn harvester is illustrated sequentially in FIGS. 1, 2 and 3. In FIG. 1 grain reel 34 is supported on arms 36 and driven by belt 40 from input shaft 44. Cutter bar 38 is driven by belt 42 extending around a pulley 118 (FIG. 8) mounted on shaft 44. Shaft 44 is rotatably journalled in a support bracket 120 secured to the rear wall 26b of table 26. Reel 34, support arms 36, belt 40 and its associated pulleys 41, 43 and 45 of FIG. 1, as shown in phantom lines, are removed from platform 26. Cylinders 96 are retracted to lower the table and elevator 26 and 24, respectively, about the axis of shaft 25 until the table coupling elements or tracks 56 are axially aligned with, and disposed below the corn harvester attachment coupling element or rollers 90. The combine is then moved axially toward the corn harvesting attachment 72 (toward the left as viewed in FIGS. 1, 2 and 3) until rollers 90 are received in coupling grooves 58. Latching hook 112 is moved from its stored position to its actuated position (FIG. 5) and cylinders 96 are extended to lift the platform and elevator in a clockwise direction as viewed in FIGS. 1 and 2 about the axis of shaft 25.

As platform 26 moves upwardly, the weight of corn harvesting attachment 72 causes it to pivot in a counter-clockwise direction about rollers 90 swinging arms 100 and tube 102 upwardly until tube 102 strikes the leading edge 112a (FIG. 5) of latching hook 112 forcing the latching hook in a counter-clockwise direction about pivot 110 thus permitting tube 102 to be received in the cavity or recess defined between lip 109 and extension 106 and seat against abutment 108 (FIG. 7). The counter-clockwise movement of latching hook 112 caused by the movement of tube 102 into the recess is insufficient to cause spring 114 to move over the center of pivot 110. Consequently, spring 114 causes latching hook 112 to return to its actuated position and engage tube 102 as shown in FIG. 5. Prior to connection of tube 102 with hook 112, pin 116 prevents over-travel of hook 112 by engaging the leading edge of the inner portion of hook 112. When latching hook 112 engages tube 102, the corn or maize harvesting attachment 72 is rigidly connected with the platform since hook 112 prevents separation of tube 102 from table 26.

With reference to FIG. 8, an input clutch element 124 is keyed at 125 to shaft 44. Clutch element 124 is formed with a raised non-circular portion 128 which axially receives a complementary shaped output clutch element 126. Clutch element 126 is formed with a pair of grooves 132 which cooperate with a ball detent 134 mounted in clutch element 124. In the position shown in FIG. 8, output clutch element 126 is shifted to the left and engages a flat 130 formed on pulley 118 to drivingly connect pulley 118 with shaft 44.

Rotatably mounted on the cylindrical portion of clutch element 124 is a sprocket 136. Mounted on shaft 70 (FIG. 4) is a sprocket 140 which may be connected with sprocket 136 by means of a chain 138. After tube 102 engages with latching hooks 112, clutch member 126 is shifted toward the right to engage a flat 142 on the hub of sprocket 136 to couple sprocket 136 with shaft 44, and coupling member 84 (FIG. 4) is shifted toward the right to couple shaft 70 with shaft 86. Sprocket 140 is welded or otherwise non-rotatably mounted at 143 on a friction clutch assembly 144 including a friction drum 146. Drum 146 is freely rotatable on the end of shaft 70 and is provided with friction clutch facing material 148 on its inner face.

Non-rotatably mounted on shaft 70 by means of welds 152 is a drive clutch member 150, and drum 146 is formed with a cylindrical recess which receives clutch member 150 and is free to rotate through a bearing ring 154 relative to clutch member 150. Rotatably received on shaft 70 is a clutch plate 156 which is supported on drum 146 by means of bolts or rods 158 threadedly secured to drum 146 by means of conventional fasteners. Springs 160 are supported on bolts 158 between clutch plate 156 and a spring seat washer 162 for urging projections 164 of clutch plate 156 into engagement with clutch member 150. Consequently, sprocket 140 is frictionally engaged through clutch member 150 with shaft 70, but can override the shaft in the event of jamming of the snapping rolls or gathering units.

To disconnect the row crop attachment from platform 26, the operator shifts coupling member 84 toward the left to disconnect shaft 70 from shaft 86, and moves latching hook 112 to its stored position as shown in phantom lines in FIG. 5. The piston of hydraulic assembly 96 is then retracted to lower table 26 and elevator 24 about the axis of shaft 25 until corn harvesting attachment 72 is seated on the ground as shown in FIGS. 1 and 2. Further downward movement of table 26 causes attachment 72 to rotate clockwise relative to table 26 about rollers 90 swinging arms 100 downwardly until they rest upon the ground as shown in FIG. 2. Further downward movement of platform 26 separates groove 58 and track 56 from rollers 90 and the combine can be backed away from the row crop attachment.

The row crop attachment can be connected and disconnected from platform 26 with little or no physical exertion on the part of the operator. The entire operation can be carried out automatically from the operator's platform with the exception of coupling the various shafts together. The farmer does not have to bear the expense of a separate header or table for corn (maize) harvesting but can convert the grain harvester by merely attaching the relatively inexpensive corn attachment to the grain table.

While a specific example of the invention has been described and illustrated, it should be understood that various alterations in the construction and arrangement of parts can be made by those skilled in the art without departing from the scope and spirit of the invention as set forth in the following claims.

What is claimed is:

1. A combine including a main body with a vertically movable harvesting table mounted thereon, said harvesting table including transverse conveying means for receiving crop material deposited onto the harvesting table, a corn harvesting attachment supported by said table for harvesting and delivering row crop material onto the transverse conveying means; and coupling means detachably connecting the corn harvesting attachment to the table characterized by said coupling means comprising interengageable coupling elements on said corn harvesting attachment and table engageable upon fore and aft axial movement of the table relative to the corn harvesting attachment.

2. A combine as defined in claim 1 in which the corn harvesting attachment is pivotally supported on the table, the weight of the corn harvesting attachment causing it to pivot downwardly with respect to the table upon upward movement of the table.

3. A combine as defined in claim 2 including stop means spaced from said coupling means for limiting the downward pivotal movement of the corn harvesting attachment with respect to the table.

4. A combine as defined in claim 3 further including latch means on the table operable upon engagement of said stop means with the table for locking the corn harvesting attachment against pivotal movement relative to the table.

5. A combine as defined in claim 4 further including an output shaft on the table, an input shaft on the corn harvesting attachment, and shaft coupling means for drivingly connecting said input and output shafts.

6. In a combine having a main body with a vertically movable elevator having a rearwardly extending conveyor for delivering to the main body, a transverse harvesting table supported on the elevator and having transverse conveying means for receiving harvested crop material and delivering it to the rearwardly extending conveyor; a corn harvesting attachment, and interengageable coupling elements on the corn harvesting attachment and transverse harvesting table for detachably mounting the corn harvesting attachment on the transverse harvesting table, said coupling elements being engageable and disenagageable in response to vertical movement of the table relative to the corn harvesting attachment.

7. The construction of claim 6 in which the table coupling element comprises grooves in the upper edges of the end walls of the table and the corn harvesting attachment coupling element comprises rollers receivable in said grooves to pivotally support the corn harvesting attachment on the table.

8. The construction of claim 7 further including abutment means on the table spaced from said grooves, and means on the corn harvesting attachment engageable with said abutment means for limiting the downward pivotal movement of the corn harvesting attachment about said coupling elements caused by the weight of the corn harvesting attachment.

9. The construction of claim 8 further including latch means on said table engageable with said abutment engaging means to prevent separation of said abutment engaging means and abutment means to thereby rigidly connect the corn harvesting attachment with the table.

10. The construction of claim 9 in which said abutment engaging means comprises rearwardly directed arms swingable upon upward movement of the table into engagement with said abutment means.

11. The construction defined in claim 10 further including an output shaft on the table, an input shaft on the corn harvesting attachment, and shaft coupling means for drivingly connecting said input and output shafts when said corn harvesting attachment is connected with the platform.

12. A combine having a main body, an elevator mounted on the main body for vertical, pivotal movement, a harvesting table supported by the elevator and having transverse conveying means for conveying cut crop material from the harvesting table to the elevator, and a corn harvesting attachment means detachably supporting the corn harvesting attachment on the harvesting table for permitting the corn harvesting attachment to remove ears of corn from their stalks and depositing the ears onto the transverse conveying means of the harvesting table.

13. A combine as defined in claim 12 further including a grain cutter bar on the leading edge of the harvesting table, a drive shaft for the cutter bar on the harvesting table, an input shaft on the corn harvesting attachment, and shaft coupling means operable to disconnect the cutter bar from the drive shaft and connect the input shaft of the corn harvesting attachment with the drive shaft.

14. A combine as defined in claim 13 further including vertical end walls on the harvesting table, said corn harvesting attachment being supported on said vertical end walls.

15. A combine as defined in claim 14 wherein said detachable mounting means includes a recess in each of said end walls, and laterally projecting rollers on said corn harvesting attachment received in said recesses.

16. A combine as defined in claim 15 further including arms projecting from said corn harvesting attachment into engagement with the harvesting table at points spaced from said recesses.

17. A combine as defined in claim 16 further including latching means operable to lock said arms into engagement with the harvesting table.

18. In a combine having a main body with a header assembly mounted thereon including a cutter bar for cuting standing grain crops, a harvesting table having transverse conveying means for receiving the harvested crop material cut by the cutter bar, and an elevator having rearwardly extending conveying means receiving from the transverse conveying means for conveying the harvested crop material to the main body, means for converting the combine to harvest corn and other row crops comprising: a corn harvesting attachment having gathering units and snapping rolls, a pair of laterally projecting coupling elements on the corn harvesting attachment, and a pair of coupling elements on the table engageable with the corn harvesting attachment coupling elements to connect the corn harvesting attachment to the table such that row crop material harvested by the corn harvesting attachment is received by the transverse conveying means of the harvesting table, and means on the harvesting table for transmitting drive to the corn harvesting attachment.

19. The construction claimed in claim 18 further including a powered output shaft on the header assembly, a shaft on the corn harvesting attachment for driving the snapping rolls and gathering units thereof, means normally driving connecting the cutter bar to the powered output shaft, means for coupling the corn harvesting attachment shaft to the powered output shaft, and means for selectively establishing drive between the powered output shaft and corn harvesting attachment shaft and disestablishing drive to the cutter bar from the powered output shaft.

20. A combine having a wheeled main body, an elevator pivotally mounted on the main body for delivering crop material into the main body, a transverse harvesting table mounted on the elevator, said table being generally in the shape of a scoop having a pair of spaced end walls joined by a rear wall and a bottom wall, transverse conveying means supported between the end walls for conveying harvested crop material to the elevator, a cutter bar mounted along the leading edge of the bottom wall for harvesting standing grain, a coupling element formed on each side wall of the table, a corn harvesting attachment having coupling elements engageable with the coupling elements on the side walls of the table to connect the corn harvesting attachment to the table, and means for transmitting drive to the corn harvesting attachment, said transverse conveying means receiving crop material from the corn harvesting attachment.

21. A combine as claimed in claim 20 wherein said table coupling elements include a horizontal, fore and aft track member formed in each side wall of the table, and wherein the corn harvester attachment coupling elements include a roller receivable on each of the track members such that the engagement of the rollers with the track members pivotally connects the corn harvesting attachment to the side walls of the table, and further including additional attachment means on the table and corn harvesting attachment for securing the corn harvester attachment against pivotal movement relative to the table.

22. A combine as claimed in claim 21 wherein a groove is formed in the track member for receiving the rollers, and further including a bearing sleeve mounted in each side wall of the table in alignment with said groove, a drive shaft mounted rotatably in each bearing sleeve, and wherein said means for driving the corn harvesting attachment includes a shaft on the corn harvesting attachment, and means for selectively coupling said corn harvester attachment shaft with said drive shaft.

23. A combine as claimed in claim 22 including a powered output shaft rotatably supported on the rear wall of the table, first and second drive members mounted on said powered output shaft for rotation therewith, a clutch member movable between said first and second drive means to selectively establish drive between said powered output shaft and the drive shaft and interrupt drive between the powered output shaft and the cutter bar.

24. A combine as claimed in claim 23 wherein said additional attachment means includes a pair of rearwardly directed arms on the corn harvester attachment engageable with the table at a point spaced from the tracks and rollers, and further including latch means on the table engageable with said arms.

25. A combine harvesting table comprising a pair of spaced end walls joined by a bottom wall and a rear wall, conveying means supported between the end walls forward of the rear wall for conveying crop material generally toward the center of the rear wall from the bottom wall, a bearing sleeve mounted on each side wall in coaxial relationship with each other, a drive shaft rotatably mounted in each of said bearing sleeves, and corn harvester attachment coupling means formed on each side wall adjacent said bearing sleeves.

26. A combine harvesting table as claimed in claim 25 wherein said corn harvester attachment coupling means includes a downwardly and rearwardly inclined track member having a substantially semi-circular groove formed therein in substantially coaxial alignment with the drive shaft.

References Cited
UNITED STATES PATENTS

| | | | |
|---|---|---|---|
| 2,651,162 | 9/1953 | Whisler | 56—60 |
| 2,658,319 | 11/1953 | Hansen | 56—2 |
| 3,026,664 | 3/1962 | Beach et al. | 56—2 |

ABRAHAM G. STONE, *Primary Examiner.*

ANTONIO F. GUIDA, *Examiner.*